(12) United States Patent
Lin et al.

(10) Patent No.: US 11,768,424 B2
(45) Date of Patent: Sep. 26, 2023

(54) FIXING DEVICE FOR ACCURATE POSITIONING OF OPTICAL ASSEMBLY, OPTICAL MODULE, AND ELECTRONIC DEVICE

(71) Applicant: Chiun Mai Communication Systems, Inc., New Taipei (TW)

(72) Inventors: Chia-Ju Lin, New Taipei (TW); Meng-Yu Chou, New Taipei (TW); Fu-Hsin Sung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 17/726,690

(22) Filed: Apr. 22, 2022

(65) Prior Publication Data

US 2022/0382131 A1 Dec. 1, 2022

(30) Foreign Application Priority Data

May 27, 2021 (CN) .......................... 202110606941.X

(51) Int. Cl.
*G03B 17/02* (2021.01)
(52) U.S. Cl.
CPC ................................... *G03B 17/02* (2013.01)
(58) Field of Classification Search
None
See application file for complete search history.

(56) References Cited

U.S. PATENT DOCUMENTS

| 8,018,527 | B2* | 9/2011 | Cheng ............... G03B 15/05 348/374 |
| 10,574,802 | B2* | 2/2020 | Chen ................ G06F 1/1686 |
| 2007/0206116 | A1* | 9/2007 | Chou ............ H04M 1/0264 348/E5.025 |
| 2014/0294376 | A1* | 10/2014 | Kim ..................... H04N 23/51 396/535 |
| 2018/0176351 | A1* | 6/2018 | Wei ................... H04N 23/57 |
| 2018/0176426 | A1* | 6/2018 | Wei ................... A61B 3/154 |
| 2018/0177082 | A1* | 6/2018 | Wei ................... H04R 1/028 |
| 2018/0267390 | A1* | 9/2018 | Kim ................... G03B 17/55 |
| 2019/0141220 | A1* | 5/2019 | Chen ............... H04M 1/0264 |
| 2019/0238668 | A1* | 8/2019 | Chen ................ H04N 23/57 |

(Continued)

FOREIGN PATENT DOCUMENTS

| CN | 105611129 A | 5/2016 |
| CN | 208316847 U | 1/2019 |
| CN | 110636190 A | 12/2019 |

*Primary Examiner* — Rodney E Fuller
(74) *Attorney, Agent, or Firm* — ScienBiziP, P.C.

(57) ABSTRACT

A fixing device for accurately fixing an optical assembly to a rear housing of an electronic device fixes the optical assembly in a predetermined position and includes a cover plate. The cover plate defines a hole and a limiting portion. The hole corresponds to a photosensitive portion of the optical assembly and the photosensitive portion is configured to protrude out of the cover plate. The limiting portion is configured to limit a movement of the optical assembly away from the rear housing before being fixed in position. The fixing device fixes the optical assembly in the predetermined position so that the assembly accuracy and efficiency are improved. An optical module including the fixing device, and an electronic device including the optical module are also provided.

19 Claims, 9 Drawing Sheets

(56) References Cited

U.S. PATENT DOCUMENTS

| | | | |
|---|---|---|---|
| 2020/0292778 A1* | 9/2020 | Li | H04N 23/45 |
| 2022/0091306 A1* | 3/2022 | Song | G02B 7/02 |
| 2022/0363814 A1* | 11/2022 | Kim | C08K 7/18 |

* cited by examiner

FIXING DEVICE FOR ACCURATE POSITIONING OF OPTICAL ASSEMBLY, OPTICAL MODULE, AND ELECTRONIC DEVICE

FIELD

This relates generally to an electronic device, and more particularly to an electronic device with a fixing device and an optical assembly.

BACKGROUND

At present, a front-facing camera module of a mobile phone is snap-fittingly connected with a circuit board after being put into a rear shell, then a display screen is put into the rear shell, and the front-facing camera module is connected with the display screen through an alignment ring. After the front-facing camera module is put into the rear shell, the front-facing camera module is guided to a preset position through the alignment ring. If deviation of the front-facing camera module is too large for the alignment ring to guide, the display screen will not be accurately assembled with the rear shell. In addition, the existence of the front-facing camera module may also affect data transmission of a nearby antenna.

BRIEF DESCRIPTION OF THE DRAWINGS

The following drawn figures are to be viewed in conjunction with the embodiments described herein.

DETAILED DESCRIPTION

Figure 1:
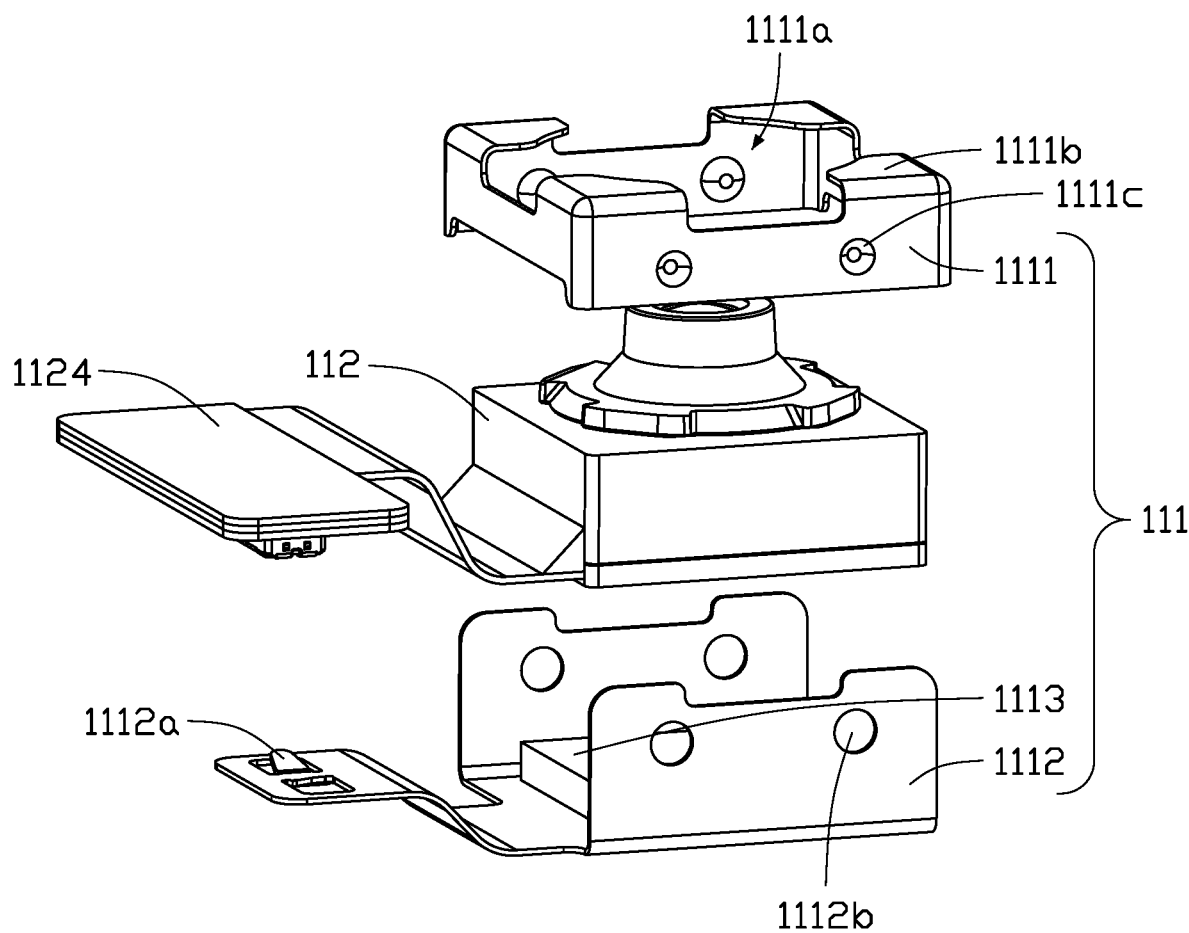
FIG. 1 is an exploded view of an optical module according to a first embodiment of the present disclosure.

The invention can be more fully understood by reading the subsequent detailed description and examples with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, when a first component is referred to as "connecting" to a second component, it is intended that the first component may be directly connected to the second component or may be indirectly connected to the second component via a third component between them. When a first component is referred to as "disposed to" a second component, it is intended that the first component may be directly disposed to the second component or may be indirectly disposed to the second component via a third component between them.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The term "and/or" used herein includes any suitable combination of one or more related items listed.

An embodiment of a fixing device is provided. The fixing device is used to fix an optical assembly to a rear housing of an electronic device. The fixing device includes a cover plate connected with the optical assembly. The cover plate defines a hole and a limiting portion. The hole corresponds to a photosensitive portion of the optical assembly and the photosensitive portion is configured to protrude out of the cover plate. The limiting portion is configured to limit a movement of the optical assembly away from the rear housing.

The above cover plate can limit the optical assembly to a predetermined position.

First Embodiment

Figure 2:
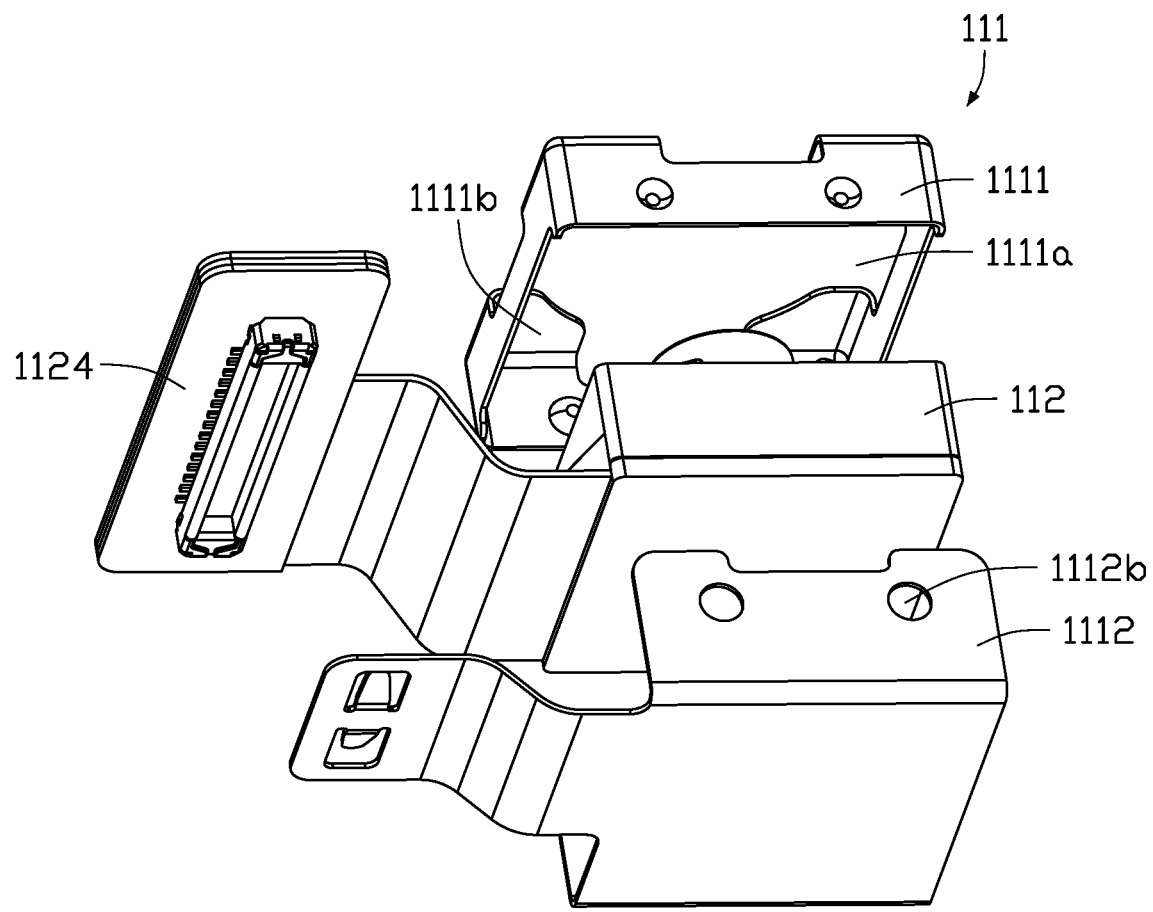
FIG. 2 is similar to FIG. 1, but viewed from another angle.

As shown in FIGS. 1 and 2, a fixing device 111 of a first embodiment is provided. The fixing device 111 is used for fixing an optical assembly 112. The fixing device 111 includes a cover plate 1111 which can be moved to resist the optical assembly 112 to limit the movement of the optical assembly 112.

The cover plate 1111 is provided with a limiting portion 1111b. When the cover plate 1111 is connected with the optical assembly 112, the limiting portion 1111b can limit the movement of the optical assembly 112 in a first direction Z, so that the optical assembly 112 moves within a limited range in the first direction Z. In this case, the cover plate 1111 surrounds a periphery of the optical assembly 112, which can limit the movement of the optical assembly 112 in a second direction X and a third direction Y, which are perpendicular to the first direction Z. Thus, the movement of the optical assembly 112 is limited in the second direction X and the third direction Y, the optical assembly 112 is thereby located in the predetermined position.

Figure 3:
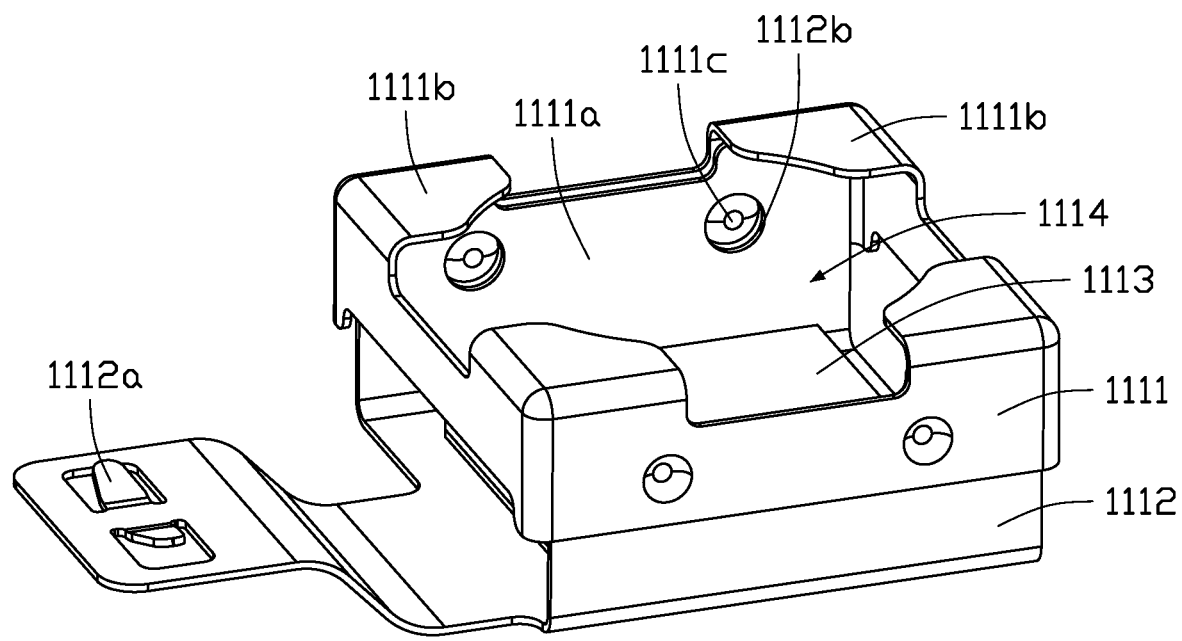
FIG. 3 is a perspective view of a fixing device of the optical module of FIG. 1.

As shown in FIGS. 1 and 3, the fixing device 111 further includes a bracket 1112. The bracket 1112 is connected with the cover plate 1111 to form a receiving space 1114 which can receive the optical assembly 112. The receiving space 1114 limits the movement of the optical assembly 112 from moving or to move slightly in the second direction X and/or the third direction Y, and can move within a limited range only in the first direction Z.

The bracket 1112 can be snap-fittingly connected with the cover plate 1111 by a snap-fit structure. The bracket 1112 can also be connected with the cover plate 1111 by screws. As an example, the bracket 1112 is snap-fittingly connected with the cover plate 1111 by a snap-fit structure.

A first snap-in portion 1111c is disposed on a side face of the cover plate 1111. A second snap-in portion 1112b corresponding to the first snap-in portion 1111c is disposed on a side face of the bracket 1112. The first snap-in portion 1111c is configured to be engaged with the second snap-in portion 1112b. When the cover plate 1111 moves towards the bracket 1112 along the first direction Z, a projection of a side face of the cover plate 1111 on a projection plane perpendicular to the second direction X is partially overlapped with a projection of a side face of the bracket 1112 on the projection plane. The cover plate 1111 continues to move until the first snap-in portion 1111c is engaged with the second snap-in portion 1112b, and the cover plate 1111 is connected with the bracket 1112.

The first snap-in portion 1111c may be a protrusion protruding from the cover plate 1111, and the second snap-in portion 1112b may be an aperture. When the protrusion is engaged with the aperture, the aperture limits a movement of the protrusion in the first direction Z, the second direction X, and the third direction Y, so that the cover plate 1111 is connected with the bracket 1112. In another embodiment, the first snap-in portion 1111c may be an aperture and the second snap-in portion 1112b may be a protrusion.

The fixing device 111 further includes a first elastic member 1113. An end of the first elastic member 1113 is disposed on the bracket 1112 or the cover plate 1111, and the other end of the first elastic member 1113 is used to resist the optical assembly 112 to dispose the optical assembly 112 elastically in the receiving space 1114. As an example, the first elastic member 1113 is fixed to the bracket 1112.

Figure 4:
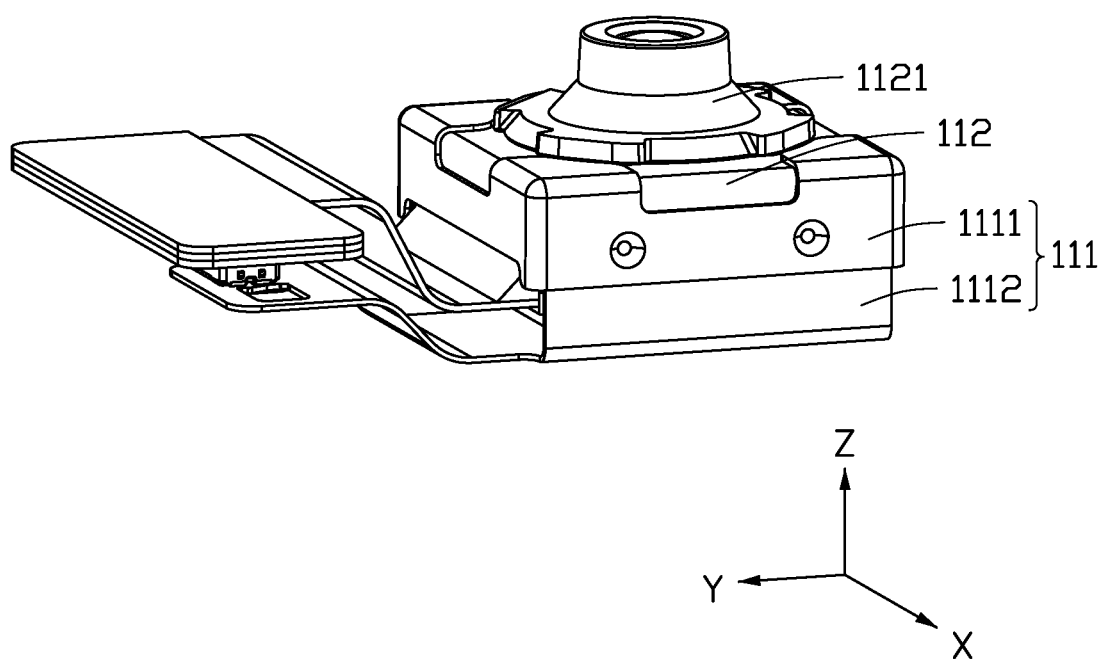
FIG. 4 is a perspective view of an optical module according to a second embodiment of the present disclosure.

As shown in FIGS. 1, 3, and 4, the first elastic member 1113 is disposed on a side of the bracket 1112 facing the receiving space 1114. When the optical assembly 112 is placed on the bracket 1112 in the first direction Z, the first elastic member 1113 is located between the optical assembly 112 and the bracket 1112, and the optical assembly 112 is elastically connected with the bracket 1112. When the cover plate 1111 moves towards the optical assembly 112 until the cover plate 1111 is engaged with the bracket 1112, the optical assembly 112 is limited within the receiving space 1114 formed by the cover plate 1111 and the bracket 1112, and the limiting portion 1111b limits the movement of the optical assembly 112 in the first direction Z.

The first elastic member 1113 is made of ethylene propylene diene monomer (EPDM), styrene isoprene styrene (SIS), styrene-ethylene/butylene-styrene block copolymer (SEBS), thermoplastic vulcanizate (TPV), or thermoplastic polyester elastomer (TPEE).

The cover plate 1111 further defines a hole 1111a. The hole 1111a penetrates the cover plate 1111 along the first direction Z. When the cover plate 1111 blocks the optical assembly 112, a photosensitive portion 1121 of the optical assembly 112 extends through the hole 1111a, so that the photosensitive portion 1121 protrudes out of the cover plate 1111 for better exposure to light.

A cross-sectional shape of the cover plate 1111 perpendicular to the first direction Z may be, but is not limited to, circular or square, as long as the movement of the optical assembly 112 in the second direction X and the third direction Y is limited when the cover plate 1111 is engaged with the bracket 1112.

The hole 1111a may be, but is not limited to, circular or square, so long as the photosensitive portion 1121 can extend through the hole 1111a without being affected by the hole 1111a.

The optical assembly 112 is fixed by the fixing device 111 by the following steps:

Placing the optical assembly 112 on the bracket 1112 in the first direction Z; and Moving the cover plate 1111 towards the optical assembly 112 along the first direction Z until the cover plate 1111 is engaged with the bracket 1112. Thus, the optical assembly 112 is limited in the receiving space 1114.

In the fixing device 111, the optical assembly 112 is limited in the receiving space 1114 by the cover plate 1111 and the bracket 1112, which limits the movement of the optical assembly 112, so that positional accuracy of the optical assembly 112 is improved.

Second Embodiment

As shown in FIG. 4, a second embodiment of an optical module 11 is provided. The optical module 11 includes the optical assembly 112 and the fixing device 111. The fixing device 111 is connected with the optical assembly 112 to confine the optical assembly 112 within a predetermined space, so that the optical assembly 112 is limited from moving or limited to slight movement in the second direction X and the third direction Y, and can move within a limited range only in the first direction Z.

When the optical assembly 112 is fixed by the fixing device 111, the photosensitive portion 1121 of the optical assembly 112 extends through and protrudes out of the cover plate 1111.

The fixing device 111 can be produced separately and then assembled with the optical assembly 112 to form the optical module 11. The fixing device 111 and the optical assembly 112 can also be integrally formed by injection molding. The assembling manners of the optical module 11 are not limited to the above-mentioned means.

The fixing device 111 limits the optical assembly 112 in a predetermined space by the cover plate 1111 and the bracket 1112 and limits the movement of the optical assembly 112, thereby positional accuracy of the optical assembly 112 is improved.

Third Embodiment

Figure 5:
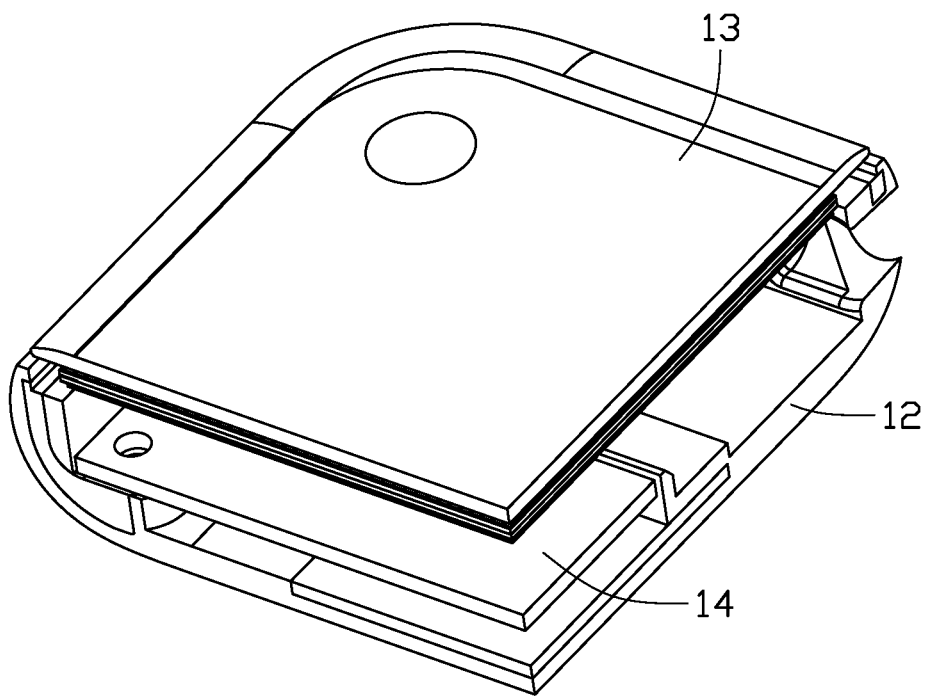
FIG. 5 is a perspective view of an electronic device according to a third embodiment of the present disclosure.
Figure 6:
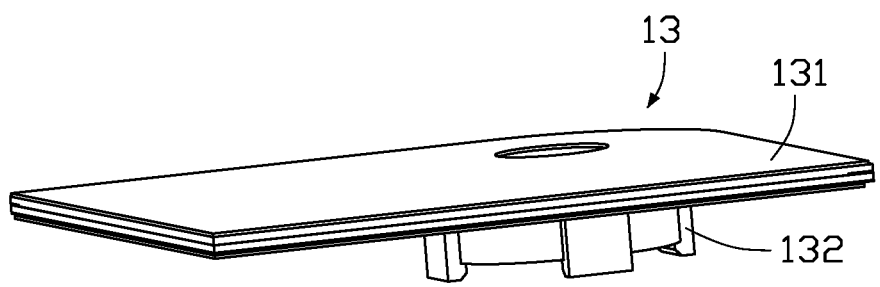
FIG. 6 is an exploded view of the electronic device of FIG. 5.
Figure 6:
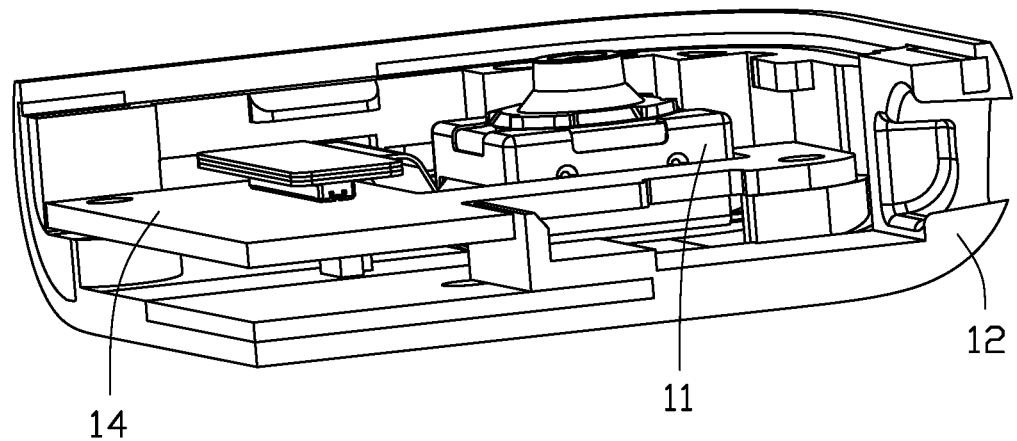
Figure 6:
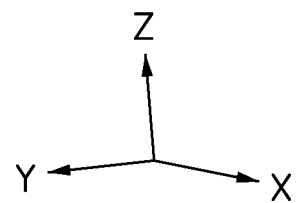

As shown in FIGS. 5 and 6, a third embodiment of an electronic device 1 is provided. The electronic device 1 includes a rear housing 12, a circuit board 14, a display module 13, a battery (not shown), and the optical module 11. The circuit board 14 is disposed on the rear housing 12. The optical module 11 is disposed on the rear housing 12 and is connected with the circuit board 14. The battery is disposed on the rear housing 12 and is connected with the circuit board 14. The display module 13 is cooperatively connected with the optical module 11 and the optical module 11 guides the display module 13 to move until the display module 13 is connected with the rear housing 12.

The circuit board 14 is fixed to the rear housing 12. The circuit board 14 may be a main board of the electronic device 1 or a main board of the optical module 11. When the circuit board 14 is the main board of the optical module 11, the electronic device 1 includes a further circuit board (not shown) connected with the circuit board 14.

Figure 7:
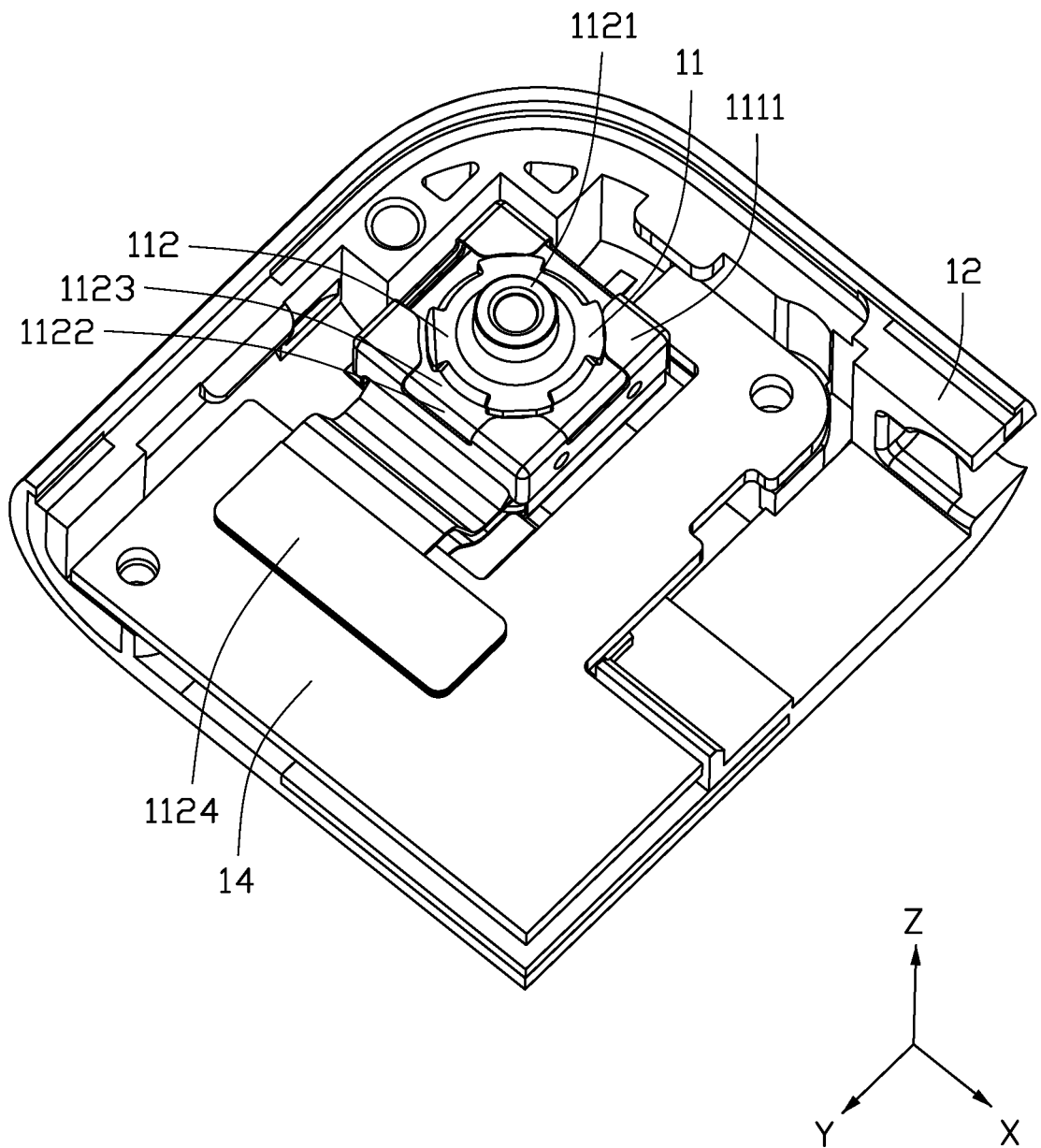
FIG. 7 is a perspective view of the electronic device of FIG. 5 without a display module.
Figure 8:
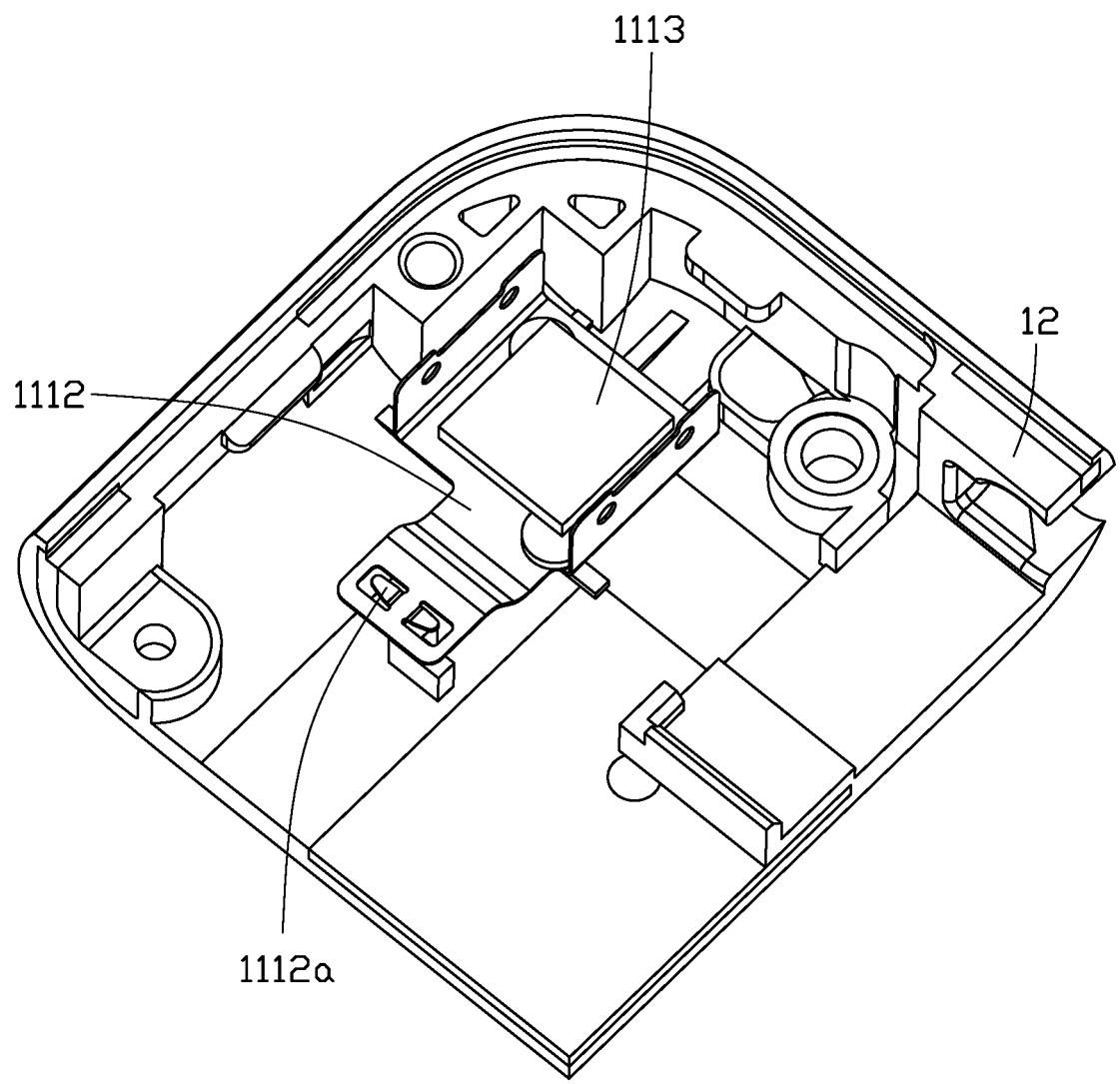
FIG. 8 is a perspective view of a bracket of the electronic device of FIG. 7.

As shown in FIGS. 7 and 8, the optical module 11 is disposed at a predetermined position of the rear housing 12. The optical module 11 can be disposed at the left top edge of the rear housing 12. The optical module 11 can also be disposed at the middle top edge, the right top edge, or any other position of the rear housing 12. As an example, the optical module 11 is arranged at the left top edge of the rear housing 12.

The bracket 1112 is fixed at a predetermined position of the rear housing 12. For example, the bracket 1112 is fixed at the left top edge of the rear housing 12. The bracket 1112 can be bonded to the rear housing 12 or fixed to the rear housing 12 by screws or other means.

Since an antenna of the electronic device 1 is arranged on a top edge of a shell and is close to the optical module 11, the possibility of affecting data transmission exists. In some embodiments, the cover plate 1111 and the bracket 1112 are made of metal, and the bracket 1112 is provided with an elastic sheet 1112a tilted along the first direction Z. Referring to FIG. 3, the elastic sheet 1112a is disposed outside the receiving space 1114, protrudes from a surface of the bracket 1112, and is inclined with respect to the surface of the bracket 1112. When the circuit board 14 is fixed to the rear housing 12, the circuit board 14 is arranged above the elastic sheet 1112a, and the elastic sheet 1112a resists a bottom surface of the circuit board 14, causing contact between the bracket 1112 and a ground terminal. The bracket 1112 and the cover plate 1111 cooperatively form a shielding space to shield against interference from the optical assembly 112, so as to prevent the optical assembly 112 from affecting the integrity of data transmission by the antenna.

As shown in FIGS. 2 and 7, the optical assembly 112 is provided with a connector 1124. When the optical assembly 112 is limited at the predetermined position by the cover plate 1111, the connector 1124 can be electrically connected with the circuit board 14.

The connector 1124 can extend in a direction perpendicular to the first direction Z and be located above the circuit board 14, and the connector 1124 can be connected with the circuit board 14 without bending, so as to prolong the service life of the connector 1124.

When the cover plate 1111 is connected with the bracket 1112 to confine the optical assembly 112 at the predetermined position of the rear housing 12, the cover plate 1111 surrounds a periphery of the optical assembly 112, preventing the movement of the optical assembly 112 in the second direction X and the third direction Y. The limiting portion 1111b of the cover plate 1111 is located above the optical assembly 112 to limit the movement of the optical assembly 112 in the first direction Z, so that the optical assembly 112 can only move within a range between the limiting portion 1111b and the bracket 1112 in the first direction Z.

Figure 9:
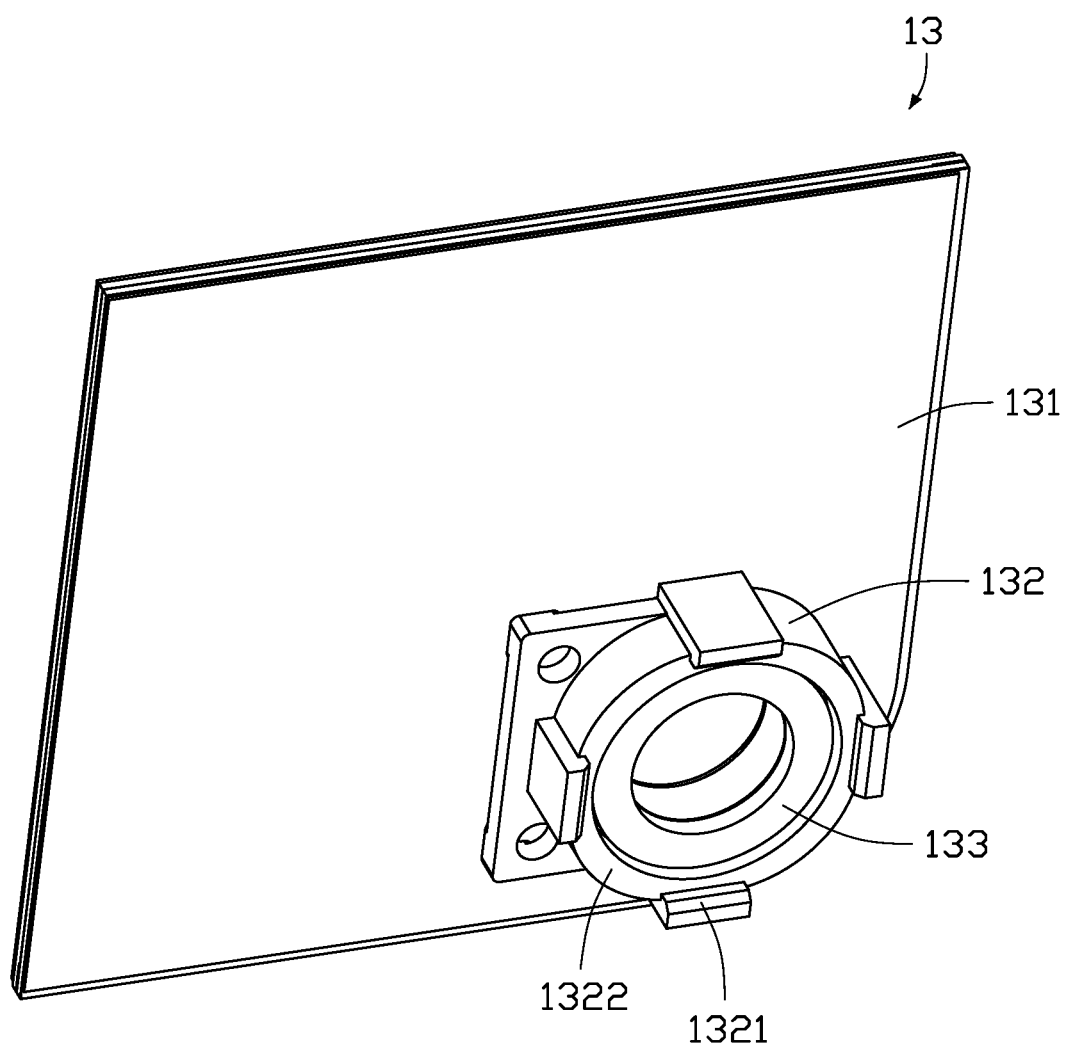
FIG. 9 is a perspective view of a display module according to the third embodiment of the present disclosure.

As shown in FIGS. 5 and 9, the display module 13 includes a display screen 131 and a positioning device 132. The display screen 131 and the rear housing 12 are respectively located on two sides of the electronic device 1, and the positioning device 132 is arranged on an inner side of the display screen 131.

The display screen 131 is used for displaying images, texts and so on. The display screen 131 can be a liquid crystal display (LCD), an organic light emitting diode display (OLED), or other type of display screens.

The positioning device 132 is used for docking with the optical assembly 112 to position the display screen 131, so that the photosensitive portion 1121 of the optical assembly 112 corresponds to the predetermined position of the display screen 131. The optical assembly 112 is disposed at the predetermined position, so that the display screen 131 can be accurately assembled with the rear housing 12 after being positioned with the optical assembly 112.

As shown in FIGS. 7 and 9, the optical assembly 112 is provided with a first guiding portion 1122 and the positioning device 132 is provided with a second guiding portion 1321. When the display module 13 moves towards the optical assembly 112 along the first direction Z, the second guiding portion 1321 contacts with the first guiding portion 1122, then the optical assembly 112 guides the positioning device 132 by guiding the second guiding portion 1321 with the first guiding portion 1122, so that the display screen 131 is positioned in the correct position for assembly, and the display screen 131 and the rear housing 12 can be accurately assembled together.

The first guiding portion 1122 may be a side edge of a main body of the optical assembly 112. The second guiding portion 1321 may be a wedge-shaped block on the positioning device 132 facing the interior of the electronic device 1. When the positioning device 132 moves with the display screen 131 in the first direction Z towards the optical module 11, a plurality of wedge-shaped blocks contact the side edge of the main body of the optical assembly 112 and guide the positioning device 132 to accurately and correctly position the display screen 131.

The first guiding portion 1122 may be a guiding hole defined on the optical assembly 112. Accordingly, the second guiding portion 1321 is a guiding column on the positioning device 132 facing the interior of the electronic device 1. The guiding column is engaged with the guide hole to guide the positioning device 132 and to correctly position the display screen 131.

The optical assembly 112 is also provided with a stop portion 1123. The positioning device 132 is also provided with a pressing portion 1322. When the display module 13 moves towards the optical assembly 112 along the first direction Z, the pressing portion 1322 resists the stop portion 1123 to cause the positioning device 132 press the optical assembly 112 to move along the first direction Z, so that a distance between the optical assembly 112 and the display screen 131 becomes constant, thereby ensuring the photosensitive accuracy of the optical assembly 112. If the stop portion 1123 and the pressing portion 1322 are omitted during the assembly of the display module 13, it would be necessary to accurately position the optical module 11 in the first direction Z in advance, so that variation of the distance between the optical module 11 and the display screen 131 would be within an acceptable range after the assembly of the display screen 131. Due to a production dimension tolerance and an assembly misalignment of the workpiece, it is difficult to control the distance between the display screen 131 and the optical assembly 112 within a high-precision range, and processing cost and assembly cost would be increased.

The stop portion 1123 may be a top surface of the main body of the optical assembly 112 and the pressing portion 1322 may be a pressing surface of the display module 13 facing the interior of the electronic device 1, as long as the distance between the optical assembly 112 and the display screen 131 remains constant when the pressing portion 1322 resists the stop portion 1123.

The display module 13 is also provided with a second elastic member 133. The second elastic member 133 is disposed on the positioning device 132. When the positioning device 132 resists the optical assembly 112, both ends of the second elastic member 133 resist the positioning device 132 and the optical assembly 112.

The second elastic member 133 may be connected with the photosensitive portion 1121 or other vulnerable parts on the optical assembly 112, so that when the positioning device 132 resists the optical assembly 112, the second elastic member 133 protects the vulnerable parts such as the photosensitive portion 1121 from being impacted, squeezed, or otherwise damaged.

It should be noted that the optical module 11 of the electronic device 1 is arranged on the inner side of the display screen 131, which is the front-facing imaging device of the electronic device 1. The electronic device 1 also includes a rear-facing imaging device which is arranged on the rear housing 12 to capture images on the rear side of the electronic device 1 through the rear housing 12. The rear-facing imaging device is not described in detail in the present disclosure.

A method for assembling the electronic device 1 includes:
Placing the bracket 1112 in a predetermined position of the rear housing 12;
Placing the circuit board 14 in a predetermined position of the rear housing 12;
Placing the optical assembly 112 on the bracket 1112 and connecting the connector 1124 with the circuit board 14;
Connecting the cover plate 1111 with the bracket 1112;
Moving the display module 13 towards the rear housing 12 along the first direction Z, and connecting a rear cover with the rear housing 12 after positioning the positioning device 132 and the optical assembly 112.

In the electronic device 1, the optical assembly 112 is limited to the predetermined position by the fixing device 111, thereby improving the assembly accuracy of the optical assembly 112. The positioning device 132 is engaged with the optical assembly 112 to guide the display screen 131, so that the display screen 131 can be accurately assembled on the rear housing 12. The bracket 1112 made of metal is connected with the circuit board 14 for grounding, and the cover plate 1111 of metal cooperates with the bracket 1112 to form the shielding space against interference from the optical assembly 112 reaching the antenna, thereby improving the reliability of antenna transmission.

The above is only a preferred embodiment of the present disclosure, and is not intended to limit the scope of the present disclosure. Although embodiments of the present disclosure are described above, it is not intended to limit the present disclosure. The present disclosure may be modified or modified to equivalent variations without departing from the technical scope of the present disclosure by any person skilled in the art. Any simple modifications, equivalent changes and modifications made to the above embodiments remain within the scope of the technical solutions of the present disclosure.

What is claimed is:

1. A fixing device for fixing an optical assembly to a rear housing of an electronic device, the fixing device comprising:
a cover plate connected with the optical assembly, the cover plate defining a hole and a limiting portion, wherein the hole corresponds to a portion of the optical assembly which is configured to protrude out of the cover plate, the limiting portion is configured to limit a movement of the optical assembly away from the rear housing;
a bracket disposed on the rear housing and connected with the cover plate to form a receiving space for receiving the optical assembly; and
an elastic sheet disposed outside the receiving space and protruding from a surface of the bracket, the elastic sheet being configured to resist against a bottom surface of a circuit board of the electronic device.

2. The fixing device of claim 1, further comprising a first snap-in portion and a second snap-in portion, wherein the first snap-in portion is disposed on a side face of the cover plate, the second snap-in portion is disposed on a side face of the bracket, the first snap-in portion is configured to be engaged with the second snap-in portion.

3. The fixing device of claim 2, wherein the first snap-in portion is a protrusion protruding from the cover plate, the second snap-in portion is an aperture.

4. The fixing device of claim 1, further comprising a first elastic member disposed on the bracket or the cover plate, wherein the first elastic member resists the optical assembly and the optical assembly is elastically connected with the bracket or the cover plate.

5. The fixing device of claim 1, wherein the elastic sheet is inclined with respect to the surface of the bracket.

6. An optical module of an electronic device, comprising:
an optical assembly; and
a fixing device for fixing the optical assembly to a rear housing of the electronic device, the fixing device comprising a cover plate connected with the optical assembly, the cover plate defining a hole and a limiting portion, wherein the hole corresponds to a portion of the optical assembly which is configured to protrude out of the cover plate, the limiting portion is configured to limit a movement of the optical assembly away from the rear housing;
wherein the fixing device further comprises a bracket disposed on the rear housing and connected with the cover plate to form a receiving space for receiving the optical assembly and an elastic sheet disposed outside the receiving space and protruding from a surface of the bracket, the elastic sheet is configured to resist against a bottom surface of a circuit board of the electronic device.

7. The optical module of claim 6, further comprising a first snap-in portion and a second snap-in portion, wherein the first snap-in portion is disposed on a side face of the cover plate, the second snap-in portion is disposed on a side face of the bracket, the first snap-in portion is configured to be engaged with the second snap-in portion.

8. The optical module of claim 7, wherein the first snap-in portion is a protrusion protruding from the cover plate, the second snap-in portion is an aperture.

9. The optical module of claim 6, wherein the fixing device further comprises a first elastic member disposed on the bracket or the cover plate, the first elastic member resists the optical assembly and the optical assembly is elastically connected with the bracket or the cover plate.

10. The optical module of claim 6, wherein the elastic sheet is inclined with respect to the surface of the bracket.

11. An electronic device comprising:
a rear housing;
a display module; and
an optical module connected with the display module, the optical module comprising:
an optical assembly; and
a fixing device for fixing the optical assembly to the rear housing, wherein the fixing device fixes the optical assembly in a predetermined position of the rear housing, the fixing device comprises a cover plate connected with the optical assembly, the cover plate defines a hole and a limiting portion, the hole corresponds to a portion of the optical assembly which is configured to protrude out of the cover plate, the limiting portion is configured to limit a movement of the optical assembly away from the rear housing;
wherein the electronic device further comprises a circuit board disposed on the rear housing and electrically connected with the optical assembly;
wherein the fixing device further comprises a bracket disposed on the rear housing and connected with the cover plate to form a receiving space for receiving the optical assembly and an elastic sheet disposed outside the receiving space and protruding from a surface of the bracket, the elastic sheet resists against a bottom surface of the circuit board.

12. The electronic device of claim 11, wherein the display module comprises a display screen and a positioning device disposed on the display screen, the optical module is connected with the positioning device to guide the display module.

13. The electronic device of claim 12, further comprising:
a first guiding portion disposed on the optical assembly; and
a second guiding portion disposed on the positioning device,
wherein the first guiding portion is connected with the second guiding portion to guide the display module.

14. The electronic device of claim 13, further comprising:
a stop portion disposed on the optical assembly; and
a pressing portion disposed on the positioning device,
wherein the pressing portion resists the stop portion and the positioning device presses the optical assembly to move.

15. The electronic device of claim 14, further comprising a first snap-in portion and a second snap-in portion, wherein the first snap-in portion is disposed on a side face of the cover plate, the second snap-in portion is disposed on a side face of the bracket, the first snap-in portion is configured to be engaged with the second snap-in portion.

16. The electronic device of claim 15, wherein the first snap-in portion is a protrusion protruding from the cover plate, the second snap-in portion is an aperture.

17. The electronic device of claim 14, wherein the fixing device further comprises a first elastic member disposed on the bracket or the cover plate, the first elastic member resists the optical assembly and the optical assembly is elastically connected with the bracket or the cover plate.

18. The electronic device of claim 14, wherein the display module further comprises a second elastic member, two ends of the second elastic member respectively resist the positioning device and the photosensitive portion.

19. The electronic device of claim 11, wherein the elastic sheet is inclined with respect to the surface of the bracket.

* * * * *